US011457577B1

(12) United States Patent
Gao

(10) Patent No.: US 11,457,577 B1
(45) Date of Patent: Oct. 4, 2022

(54) SYSTEM AND METHOD FOR MAINTAINING TEMPERATURE STABILITY OF PLANT ROOTS IN AN AEROPONICS GROW UNIT

(71) Applicant: Wanjun Gao, Weston, FL (US)

(72) Inventor: Wanjun Gao, Weston, FL (US)

( * ) Notice: Subject to any disclaimer, the term of this patent is extended or adjusted under 35 U.S.C. 154(b) by 65 days.

(21) Appl. No.: 17/184,994

(22) Filed: Feb. 25, 2021

Related U.S. Application Data

(63) Continuation-in-part of application No. 15/887,881, filed on Mar. 3, 2018, now abandoned.

(51) Int. Cl.
*A01G 31/02* (2006.01)

(52) U.S. Cl.
CPC .................... *A01G 31/02* (2013.01)

(58) Field of Classification Search
CPC ........ A01G 31/00; A01G 31/02; A01G 31/06; A01G 2031/006
See application file for complete search history.

(56) References Cited

U.S. PATENT DOCUMENTS

| | | | | | |
|---|---|---|---|---|---|
| 4,332,105 | A * | 6/1982 | Nir | .................. | A01G 31/02 239/69 |
| 4,669,217 | A * | 6/1987 | Fraze | ................. | A01G 31/02 47/62 A |
| 5,501,037 | A * | 3/1996 | Aldokimov | .......... | A01G 31/00 47/60 |
| 5,826,374 | A * | 10/1998 | Baca | ................. | A01G 31/02 47/60 |
| 5,937,575 | A * | 8/1999 | Zobel | .................. | A01G 31/02 47/62 A |
| 7,823,328 | B2 * | 11/2010 | Walhovd | ............... | A01G 31/02 47/62 A |
| 8,225,549 | B2 * | 7/2012 | Simmons | ............... | A01G 31/02 47/62 N |
| 8,250,809 | B2 * | 8/2012 | Simmons | ............... | A01G 31/02 47/62 N |
| 8,726,568 | B2 * | 5/2014 | Wilson | ................. | A01K 63/003 47/62 R |
| 9,516,822 | B2 * | 12/2016 | Gonyer | .................. | A01G 31/02 |
| 10,072,880 | B2 * | 9/2018 | Newsam | .................. | A01G 9/20 |
| 10,306,846 | B2 * | 6/2019 | Lee | ........................ | A01G 31/02 |
| 10,681,876 | B2 * | 6/2020 | Varesano | ............... | B05B 5/032 |
| 10,729,080 | B2 * | 8/2020 | Staffeldt | ............. | A01G 31/047 |

(Continued)

*Primary Examiner* — Monica L Barlow
*Assistant Examiner* — Aaron M Rodziwicz
(74) *Attorney, Agent, or Firm* — Howard M. Gitten, Esq.; Lewis Brisbois Bisgaard & Smith LLP

(57) ABSTRACT

A modular aeroponic grow system utilizing circulated reservoirs of temperature-regulated liquid nutrient solution to maintain temperature stability of plant roots within a grow system includes a control unit, one or more grow units, a liquid nutrient solution reservoir circulation conduit system, and a liquid nutrient solution mist delivery conduit system independent of, and isolated from, the reservoir circulation system, wherein air temperature stability with a grow unit interior chamber is maintained by regulating the temperature of liquid nutrient solution flowing through the mist delivery conduit system, and wherein the temperature of liquid nutrient solution flowing through the mist delivery conduit system is maintained by regulating the temperature of liquid nutrient solution flowing through the reservoir circulation conduit system.

20 Claims, 11 Drawing Sheets

(56) References Cited

U.S. PATENT DOCUMENTS

| | | | |
|---|---|---|---|
| 10,973,186 B2* | 4/2021 | Blackburn | A01G 9/029 |
| 11,229,169 B2* | 1/2022 | Mendes | A01G 31/02 |
| 2017/0105373 A1* | 4/2017 | Byron, III | A01K 63/04 |
| 2018/0035626 A1* | 2/2018 | Bailey | A01G 31/06 |
| 2018/0368346 A1* | 12/2018 | Watson | A01G 31/06 |
| 2020/0037514 A1* | 2/2020 | Massey | A01G 9/247 |
| 2020/0137964 A1* | 5/2020 | Bouchard | H04W 4/80 |
| 2020/0229362 A1* | 7/2020 | Scott | A01G 31/02 |

* cited by examiner

SYSTEM AND METHOD FOR MAINTAINING TEMPERATURE STABILITY OF PLANT ROOTS IN AN AEROPONICS GROW UNIT

CROSS-REFERENCE TO RELATED APPLICATION

This U.S. non-provisional patent application is a continuation-in-part of co-pending U.S. non-provisional patent application Ser. No. 15/887,881, having a filing date of Feb. 2, 2018, the entire contents of which is incorporated by reference herein.

FIELD OF THE INVENTION

The present disclosure is generally relates to aeroponic growth of plants. More particularly, the present disclosure relates to a modular aeroponic growing system and method utilizing liquid nutrient solution reservoirs to maintain temperature stability of plant roots.

BACKGROUND OF THE INVENTION

There are numerous types of systems for growing plants. Traditional plant growing systems that rely on soil or similar mediums are classified as geoponics. However, as is well known, soil is not actually required to grow plants. For example, a hydroponic system eliminates the need for soil and instead utilizes water containing essential nutrients as the growth media. Hydroponic systems can be more efficient than geoponic systems, as plants find it easier to take in nutrients from water than from soil, and plant growth can be controlled by the nutrients made available to the plants. Aeroponic systems go a step further by growing plants in an air and water mist environment.

In an aeroponic system, hanging plant roots are bathed in a nutrient-rich mist in a controlled and isolated environment. In this type of system, cultivators are not only able to have complete control of the nutrients supplied to the roots (i.e. the nutrient intake), but they are also able to allow the hanging plant roots to grow larger and to more easily absorb the nutrients and oxygen being supplied. Benefits of aeroponic growing methods include increased yields, reduced consumption of water and nutrients, and reduced growth cycles. However, there are challenges introduced by the aeroponic system structure itself. One well-recognized issue is root damage caused by root temperature fluctuation during the aeroponic grow cycle. Unlike soil-based growing systems or deep-water hydroponics, in aeroponic systems the plant roots remain suspended in air. Without thermo-capacitors such as wet soil or water, the root temperature is highly susceptible to a greater degree of fluctuation. This ultimately causes root stress, and increases the likelihood of bacteria-related root diseases. Scientific studies have confirmed that maintaining lower, stable root temperatures reduces root diseases caused by bacteria and other pathogens. Furthermore, temperature changes, or fluctuations, negatively affect nutrient absorption by influencing transpiration—the movement of water through a plant and its evaporation from aerial parts, such as leaves, stems and flowers. Maintaining reduced, stable root temperatures creates a temperature differential between the plant root and plant shoot, which promotes a healthier transpiration process resulting in better nutrient delivery to the plant.

Various factors affect the root temperatures within the growing environment, including the air temperature within the root chamber, the homogeneity of the air temperature throughout the root chamber, and the temperature of nutrient solution mist deposited on the roots (i.e. in the root zone). In addition to providing a stable target air temperature throughout the root chamber, emitting a nutrient mist, or spray, having a temperature approaching that of the target root temperature would be highly beneficial. Climate variations in certain geographic regions of the world introduce a further challenge. That is, geographic areas that have greater natural temperature fluctuations increase the challenge of maintaining a target root temperature.

Some known aeroponics systems incorporate a temperature control means whereby the temperature in the rhizosphere, or root zone, of the plant is continually monitored. When the temperature exceeds preset thresholds, the controller triggers the misters to activate to bring the root temperature down. However, this approach has inherent disadvantages. In aeroponic system environments, relatively small volumes of liquid nutrient solution are delivered to the roots; accordingly, spraying actions are intermittent and brief. Therefore, additional misting may lead to saturation of the roots, which is undesirable since it is generally preferred to keep the root hairs close to 100% relative humidity without much excess nutrient dripping from the roots. Furthermore, increased misting may lead to undesirable root chamber heating and associated root temperature fluctuation. Consequently, saturating the roots with liquid nutrient solution in order to maintain target root temperatures effectively reduces or eliminates the benefits of employing the aeroponic growing method in the first place.

Accordingly, there is a well-recognized need in the aeroponics industry for a high-pressure aeroponics system that overcomes at least the aforementioned drawbacks, disadvantages, and limitations associated with existing high pressure aeroponics systems. In particular, there is a need for a high pressure aeroponics system that maintains the root temperatures of plants at a stable, target temperature without relying upon the sprayed nutrient solution mist. It would be further desirable to provide such a system having a modular configuration which could be arranged as a stand-alone grow unit or, alternatively, as a control unit and one or more corresponding grow units. Moreover, it would be beneficial to provide such a system wherein the liquid nutrient solution used to create the nutrient mist is maintained within the respective control unit and grow units, and is used as a primary means of maintaining plant root temperature stability within the grow unit interior compartments, or root chambers. Preferably, the system should be safe, easy to use, portable, modularized, capable of maintaining pressure throughout the system without requiring a continuously running pump, and capable of delivering nutrient solution with precise timing without altering the characteristics of the nutrient solution.

SUMMARY OF THE INVENTION

The present invention is generally directed to a modular aeroponic grow system utilizing circulated temperature-regulated liquid nutrient solution to maintain temperature stability of a plant root within a grow system environment.

In an exemplary implementation, the modular aeroponic grow system may comprise:

a control unit, including a control unit tank defining a control unit tank interior chamber, a control unit reservoir of liquid nutrient solution contained within the control unit tank interior chamber, a control unit reservoir temperature-regulating device for regulating the temperature of the control unit reservoir of liquid nutrient solution, a control unit reservoir pressurizing device in fluid communication with the control unit reservoir of liquid nutrient solution, and a control unit reservoir circulation device in fluid communication with the control unit reservoir of liquid nutrient solution;

a grow unit, including a grow unit tank defining a grow unit tank interior chamber, and a grow unit reservoir of liquid nutrient solution contained within the grow unit tank interior chamber;

a reservoir circulation conduit subsystem in fluid communication with the control unit reservoir and the grow unit reservoir, wherein liquid nutrient solution is driven through the reservoir circulation conduit subsystem by the control unit reservoir circulation device; and a liquid nutrient solution mist delivery conduit subsystem, including a mist delivery conduit subsystem input end in fluid communication with the control unit reservoir via the control unit reservoir pressurizing device, and a mist delivery conduit subsystem grow unit output end extending through the grow unit reservoir and terminating within the grow unit interior chamber at a grow unit mist delivery device, wherein air temperature stability within the interior chamber of the grow unit is maintained by regulating the temperature of liquid nutrient solution flowing through the mist delivery conduit subsystem, and wherein the temperature of liquid nutrient solution flowing through the mist delivery conduit subsystem is maintained by regulating the temperature of liquid nutrient solution flowing through the reservoir circulation conduit subsystem.

In accordance with an aspect of the present invention, the control unit and the grow unit may be integrated into a unitary, stand-alone system.

In another aspect, the system may include a single control unit in fluid communication with a single grow unit or multiple grow units.

In another aspect, the system employs a temperature-conditioned reservoir of liquid nutrient solution circulated through two different, isolated conduit system routes—the reservoir circulation conduit subsystem route and the mist delivery conduit subsystem route—in order to perform the following two respective tasks simultaneously: (1) transmission of nutrients from the liquid nutrient solution reservoirs to the root chambers, and subsequent mist delivery of the liquid nutrient solution to the roots (i.e., via the mist delivery conduit subsystem); and (2) circulation of temperature-conditioned nutrient solution among the control unit reservoir and grow unit reservoir(s) to effectively stabilize the air temperature within the grow unit root chambers via a heat exchange mechanism between the liquid nutrient solution reservoirs and the respective interior root chambers.

In another aspect, the system may include a single control unit in fluid communication with multiple grow units, wherein the reservoir circulation conduit subsystem has a serial, closed circuit configuration.

In another aspect, the system may include a single control unit in fluid communication with multiple grow units, wherein the reservoir circulation conduit subsystem has a parallel, closed circuit configuration.

In another aspect, the mist delivery conduit subsystem may employ heat conductive staging tube lengths running through the liquid nutrient solution reservoirs of the grow units, such that the temperature of the liquid nutrient solution circulating through the reservoir circulation conduit subsystem may be employed to regulate the temperature of liquid nutrient solution in the mist delivery conduit subsystem prior to emission through corresponding grow unit mist delivery nozzles. In this manner, the heat conductive staging tubes effectively reduce root chamber temperature fluctuations resulting during emission of nutrient solution mist toward the roots.

In another aspect, air temperature stability within the interior chamber of each grow unit may be maintained by regulating the temperature of the respective grow unit reservoir of liquid nutrient solution. In other words, the exposed grow unit reservoirs in the respective interior chambers provide a heat radiating function to regulate the interior chamber air temperature. Additionally, the liquid nutrient solution reservoirs in the grow units function as thermo-capacitors to mitigate air temperature fluctuation within the respective grow unit interior chambers.

In another aspect, the temperature of the grow unit reservoirs of liquid nutrient solution may be regulated by controlling the temperature of the control unit reservoir of liquid nutrient solution via the control unit temperature-regulating device.

In another aspect, each grow unit may include a respective grow unit basin and grow unit lid selectively covering the grow unit basin, wherein the grow unit lid has one or more openings sized and shaped for receiving plant grow net cups therethrough such that corresponding plant roots are contained within the grow unit interior space when the plant grow net cups are seated in the corresponding openings.

In another aspect, the control unit and grow unit(s) may have a thermally-insulative construction to minimize the influence of external ambient heat.

In another aspect, the control unit temperature-regulating device may include a liquid nutrient solution temperature-sensing component and a liquid nutrient solution temperature-adjusting component.

In another aspect, the control unit may include a liquid level sensing device for monitoring the surface level of the control unit liquid nutrient solution reservoir, thereby ensuring desired nutrient solution reservoir levels for optimal nutrient solution circulation and delivery. In a further aspect, the liquid level sensing device may comprise a pressure sensor located at the bottom of the corresponding reservoir.

In another aspect, the mist delivery subsystem control unit reservoir pressurizing device may include a liquid pump, a liquid accumulator tank, an air compressor, an air siphoning device, or any combination thereof.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying figures, where like numerals denote like elements, and in which.

DETAILED DESCRIPTION OF PREFERRED IMPLEMENTATIONS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. There is no intention to be bound by any expressed or implied theory presented in the preceding technical field, background, brief summary or the following detailed description. It is also to be understood that any specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
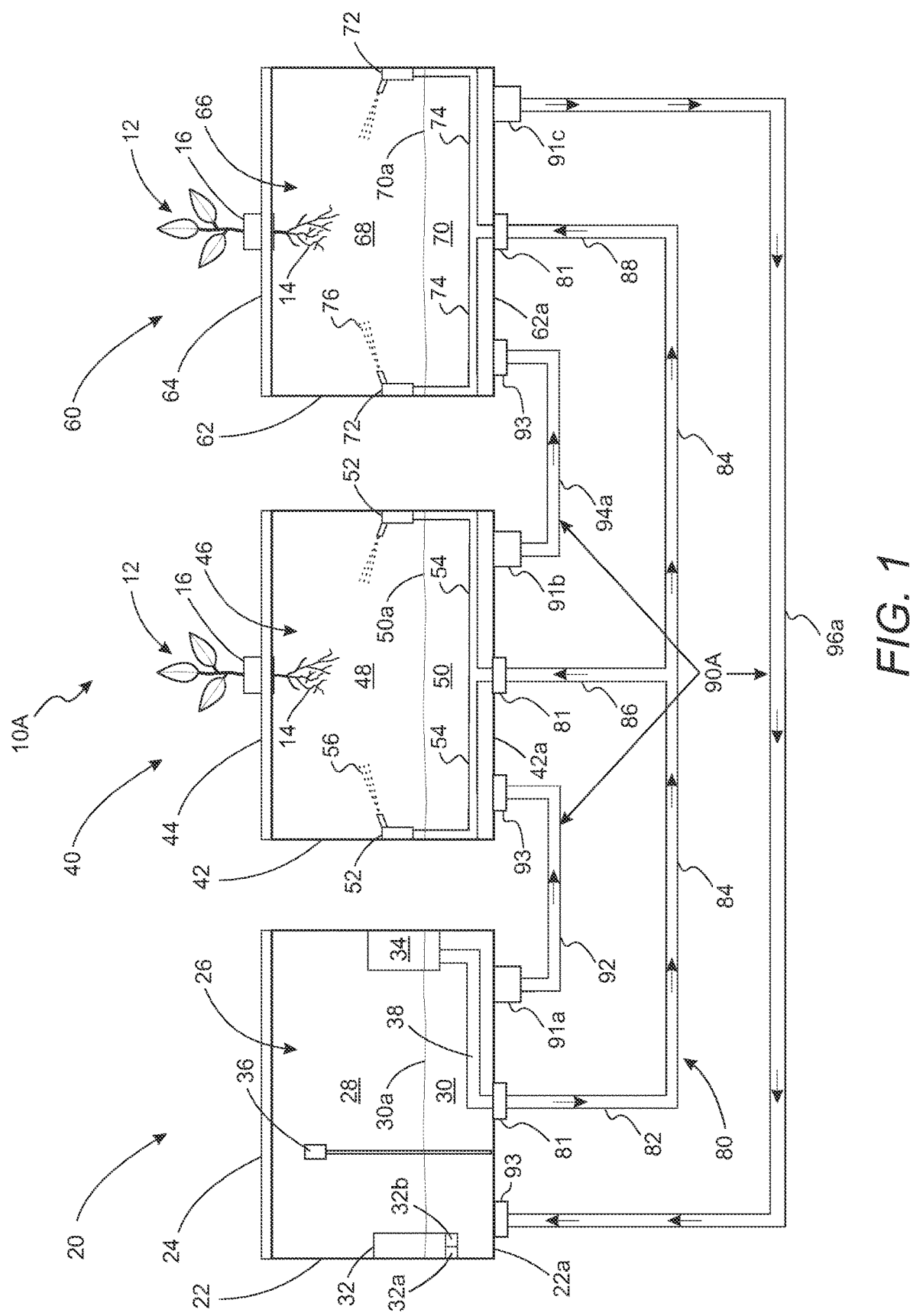
FIG. 1 is a schematic representation of a modular aeroponic growing system including a reservoir circulation conduit subsystem 90A having a serial, closed circuit configuration/topology.
Figure 2:
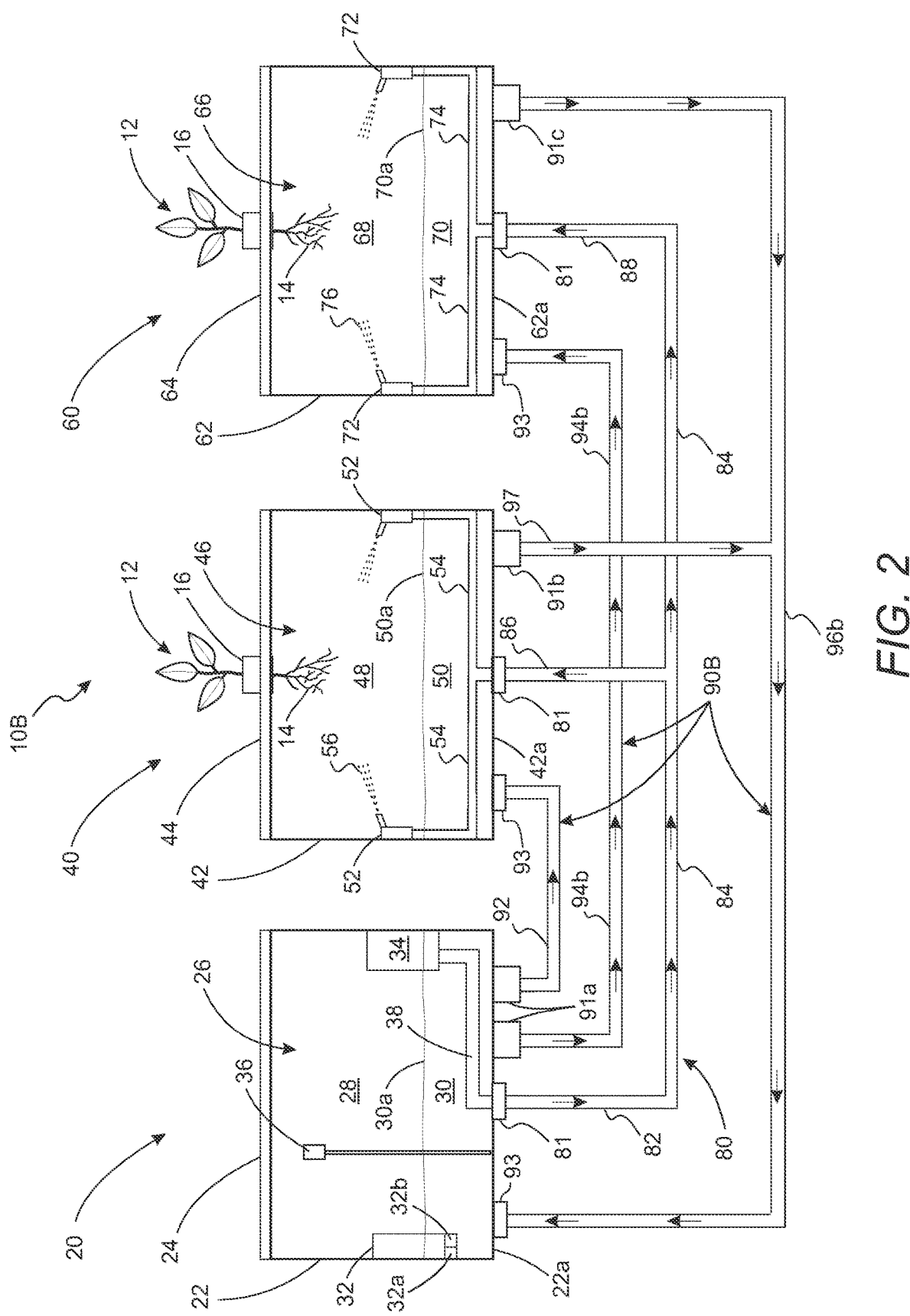
FIG. 2 is a schematic representation of a modular aeroponic growing system including a reservoir circulation conduit subsystem 90B having a parallel, closed circuit configuration/topology.
Figure 3:
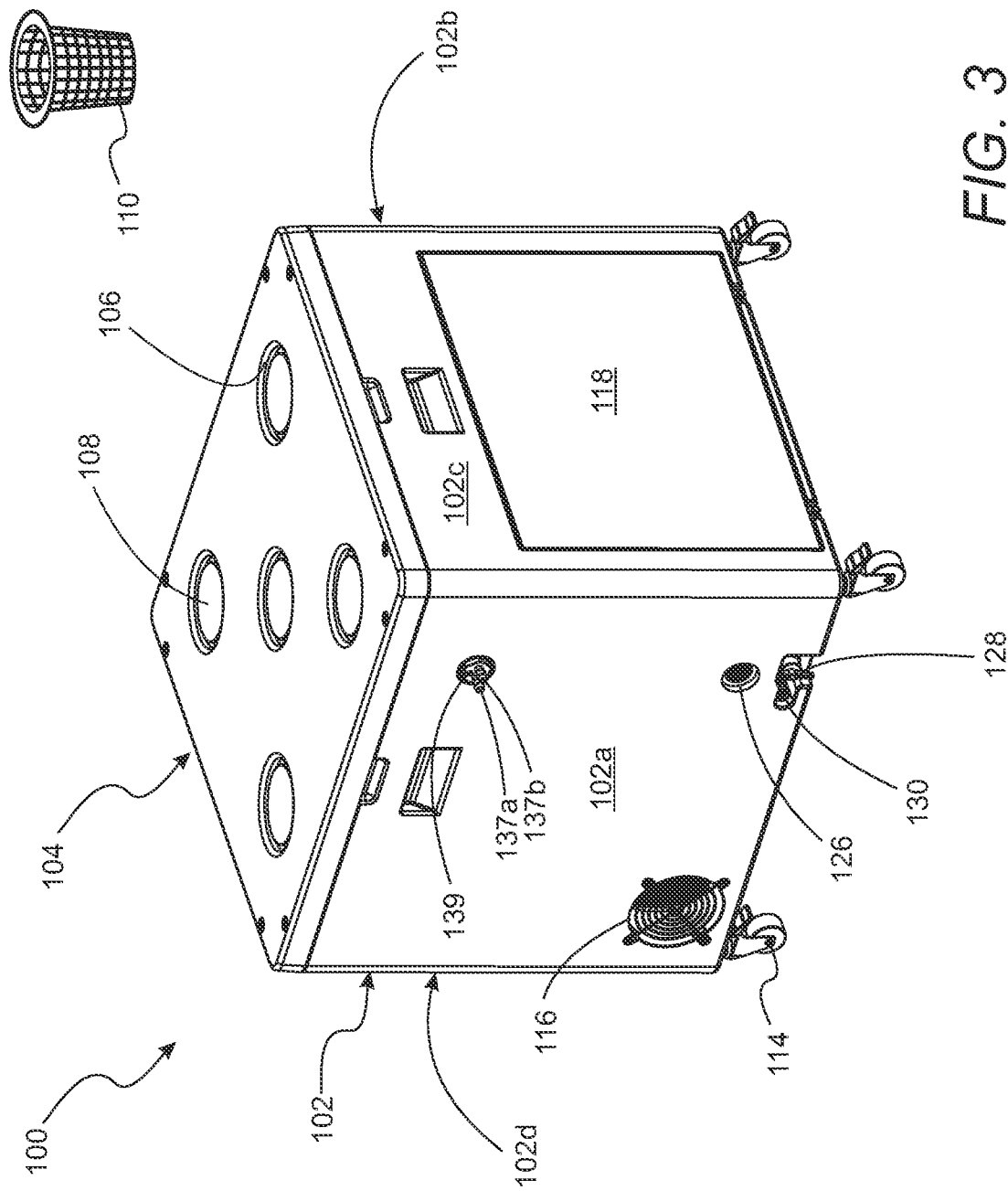
FIG. 3 is an upper-front-right side perspective view of a fully-assembled control unit 100, in accordance with an exemplary implementation of the present invention.

Referring initially to FIG. 1, a schematic view of a modular aeroponic plant grow system 10A is shown in accordance with a first exemplary configuration incorporating a liquid nutrient solution circulation conduit subsystem 90A having a serial topology. Broadly, the system 10A includes a control unit 20, a first grow unit 40, a second grow unit 60, a liquid nutrient solution mist delivery conduit subsystem 80 for delivering liquid nutrient solution from control unit reservoir 30 to the first and second grow units, and a reservoir circulation conduit subsystem 90A having a serial topology for circulating liquid nutrient solution between the control unit reservoir and the first and second grow unit reservoirs, 50 and 70, respectively.

Control unit 20 includes a control unit tank 22 having a control unit tank base 22a, and a control unit tank lid 24 selectively attachable to the open top thereof. Together, the control unit tank 22 and lid 24 define a control unit tank interior chamber 26. Control unit tank interior chamber 26 comprises a volume of liquid nutrient solution in the form of control unit reservoir 30 and a control unit tank air chamber 28 between control unit reservoir surface level 30a and control unit tank lid 24. As described in further detail herein, control unit tank air chamber 28 may function as a "plant root chamber" in a standalone embodiment of the present invention (i.e. where control unit 20 functions as a combined control/grow unit). A control unit reservoir temperature-regulating device 32 is provided, including a liquid nutrient solution temperature-sensing component 32a and a liquid nutrient solution temperature-adjusting component 32b. Control unit reservoir temperature-regulating device 32 is used for regulating the temperature of control unit reservoir 30. As described in more detail below, a reservoir pressuring device 34 is provided for controllably urging liquid nutrient solution from control unit reservoir 30, through liquid nutrient solution mist delivery conduit subsystem 80, to first and second grow unit mist delivery devices, 52 and 72, respectively. Control unit 20 may further include a liquid level sensing device 36 for measuring and monitoring the surface level 30a of control unit tank liquid nutrient solution reservoir 30. As described in more detail below, liquid level sensing device 36 is preferably incorporated in the form of a pressure sensing device seated upon control unit tank base 22a (i.e. at the bottom of control unit tank liquid nutrient solution reservoir 30).

First grow unit 40 includes a first grow unit tank 42 having a first grow unit tank base 42a, and a first grow unit tank lid 44 selectively attachable to the open top thereof. Together, the first grow unit tank 42 and lid 44 define a first grow unit tank interior chamber 46. First grow unit tank interior chamber 46 comprises a volume of liquid nutrient solution in the form of a first grow unit reservoir 50 and a first grow unit tank interior (root) chamber 48 between first grow unit reservoir surface level 50a and first grow unit tank lid 44. One or more first grow unit mist delivery devices 52 are mounted within root chamber 48 for delivering bursts of liquid nutrient solution mist 56, or spray, toward the roots 14 of plants 12 during system operation. As described in more detail below, first grow unit heat-conducting staging tube lengths 54 run through first grow unit tank liquid nutrient solution reservoir 50 and form part of liquid nutrient solution mist delivery conduit subsystem 80.

Second grow unit 60 includes as second grow unit tank 62 having a second grow unit tank base 62a, and a second grow unit tank lid 64 selectively attachable to the open top thereof. Together, the second grow unit tank 62 and lid 64 define a second grow unit tank interior chamber 66. Second grow unit tank interior chamber 66 comprises a volume of liquid nutrient solution in the form of a second grow unit reservoir 70 and a second grow unit tank interior (root) chamber 68 between second grow unit reservoir surface level 70a and second grow unit tank lid 64. One or more second grow unit mist delivery devices 72 are mounted within root chamber 68 for delivering bursts of liquid nutrient solution mist 76, or spray, toward the roots 14 of plants 12 during system operation. As described in more detail herein, second grow unit heat-conducting staging tube lengths 74 run through second grow unit tank liquid nutrient solution reservoir 70 and form part of liquid nutrient solution mist delivery conduit subsystem 80.

Liquid nutrient solution mist delivery conduit subsystem 80 is generally comprised of a control unit conduit segment 38 extending from the reservoir pressuring device 34 to a mist delivery conduit subsystem coupler, where it is interconnected to control unit outlet conduit length 82. Control unit outlet conduit length 82 subsequently transitions to a mist delivery conduit subsystem main conduit length 84. Main conduit length 84 subsequently branches off into first grow unit inlet conduit length 86 and second grow unit inlet conduit length 88. First grow unit inlet conduit length 86 subsequently interconnects, via coupler 81, with first grow unit heat-conducting staging tube length 54 which, in turn, may have one or more ends terminating at respective mist delivery devices 52. In similar fashion, second grow unit inlet conduit length 88 subsequently interconnects, via coupler 81, with second grow unit heat-conducting staging tube length 74 which, in turn, may have one or more ends terminating at respective mist delivery devices 72.

During operation of aeroponic system 10A, reservoir pressuring device 34 urges liquid nutrient solution from control unit tank liquid nutrient solution reservoir 30 out through control unit conduit segment 38 into control unit outlet conduit length 82. Subsequently, the liquid nutrient solution flows into main conduit length 84. The liquid nutrient solution subsequently flows through main conduit length 84 where it branches off such that some of the nutrient solution flows through first grow unit inlet conduit length 86, and some of the nutrient solution flows through second grow unit inlet conduit length 88. Finally, the nutrient solution flowing through first grow unit inlet conduit length 86 flows through the first grow unit heat-conducting staging tube lengths 54 and is ultimately emitted as a nutrient solution mist, or spray 56, through first grow unit mist delivery devices 52. Likewise, the nutrient solution flowing through second grow unit inlet conduit length 88 flows through the second grow unit heat-conducting staging tube lengths 74 and is ultimately emitted as a nutrient solution mist, or spray 76, through first grow unit mist delivery devices 72.

Reservoir circulation conduit subsystem 90A (Serial Circuit Configuration) is generally comprised of a control unit outlet conduit length 92 extending from control unit 20 to first grow unit 40, a first grow unit outlet conduit length 94 extending from first grow unit 40 to second grow unit 60, and a control unit reservoir inlet conduit length 96*a* extending from control unit 20 to second grow unit 60.

At an inlet end, control unit outlet conduit length 92 is in fluid communication with control unit tank liquid nutrient solution reservoir 30 via a control unit reservoir circulation device 91*a*. At an opposite outlet end, control unit outlet conduit length 92 is in fluid communication with first grow unit tank nutrient solution reservoir 50 and may be attached to a first grow unit inlet conduit (not shown) via a reservoir circulation conduit subsystem coupler 93. At an inlet end, first grow unit outlet conduit length 94*a* is in fluid communication with first grow unit tank liquid nutrient solution reservoir 50 via a first grow unit reservoir circulation device 91*b*. At an opposite outlet end, first grow unit outlet conduit length 94 is in fluid communication with second grow unit tank nutrient solution reservoir 70 and may be attached to a second grow unit inlet conduit (not shown) via a reservoir circulation conduit subsystem coupler 93. At an inlet end, control unit reservoir inlet conduit length 96*a* is in fluid communication with second grow unit tank liquid nutrient solution reservoir 70 via a second grow unit reservoir circulation device 91*c*. At an opposite outlet end, control unit reservoir inlet conduit length 96*a* is in fluid communication with control unit tank liquid nutrient solution reservoir 30 and may be attached to a control unit inlet conduit (not shown) via a reservoir circulation conduit subsystem coupler 93.

During operation of aeroponic system 10A, control unit reservoir circulation device 91*a* urges liquid nutrient solution from control unit tank liquid nutrient solution reservoir 30 out through control unit outlet conduit length 92 and into first grow unit liquid nutrient solution reservoir 50. Concurrently, first grow unit reservoir circulation device 91*b* urges liquid nutrient solution from first grow unit tank liquid nutrient solution reservoir 50 out through first grow unit outlet conduit length 94*a* and into second grow unit liquid nutrient solution reservoir 70. Concurrently, second grow unit reservoir circulation device 91*c* urges liquid nutrient solution from second grow unit tank liquid nutrient solution reservoir 70 into and through control unit reservoir inlet conduit length 96*a*, from which it is emitted back into control unit liquid nutrient solution reservoir 30, thereby, completing the reservoir circulation cycle.

Referring now to FIG. 2, a schematic view of a modular aeroponic plant growing system 10B is shown in accordance with a second exemplary configuration incorporating a parallel reservoir circulation conduit subsystem topology. Modular aeroponic plant grow system 10B is identical to modular aeroponic plant grow system 10A, except for the configuration of liquid nutrient solution reservoir circulation conduit subsystem 90B.

Reservoir circulation conduit subsystem 90B (Parallel Circuit Configuration) is generally comprised of control unit outlet conduit length 92 extending from control unit 20 to first grow unit 40, control unit outlet conduit length 94*b* extending from control unit 20 to second grow unit 60, and control unit reservoir inlet length 96*b* extending from control unit 20 to both first grow unit 40 and second grow unit 60, providing fluid communication between control unit tank reservoir 30 and first grow unit tank reservoir 50 (via a first grow unit tank reservoir outlet conduit length 97), and providing fluid communication between control unit tank reservoir 30 and second grow unit tank reservoir 70. At an inlet end, control unit outlet conduit length 92 is in fluid communication with control unit tank liquid nutrient solution reservoir 30 via a control unit reservoir circulation device 91*a*. At an opposite outlet end, control unit outlet conduit length 92 is in fluid communication with first grow unit tank nutrient solution reservoir 50 and may be attached to a first grow unit inlet conduit (not shown) via a reservoir circulation conduit subsystem coupler 93. At an inlet end, control unit outlet conduit length 94*b* is in fluid communication with control unit reservoir 30 and may be attached to a control unit inlet conduit (not shown) via a reservoir circulation device 91*a*. At an opposite outlet end, control unit outlet conduit length 94*b* is in fluid communication with second grow unit reservoir 70 and may be attached to a second grow unit inlet conduit (not shown) via a reservoir circulation conduit subsystem coupler 93. At an inlet end, control unit reservoir inlet conduit length 96*b* is in fluid communication with second grow unit tank liquid nutrient solution reservoir 70 via a second grow unit reservoir circulation device 91*c*. At an opposite outlet end, control unit reservoir inlet conduit length 96*b* is in fluid communication with control unit tank liquid nutrient solution reservoir 30 and may be attached to a control unit inlet conduit length (not shown) via a reservoir circulation conduit subsystem coupler 93. Additionally, a first grow unit reservoir outlet conduit length 97 provides fluid communication between first grow unit liquid nutrient solution reservoir 50 and control unit reservoir inlet conduit length 96b. At an inlet end, first grow unit tank reservoir outlet conduit length 97 is in fluid communication with first grow unit tank reservoir 50 and may be attached to a first grow unit outlet conduit length (not shown) via a reservoir circulation device 91c.

During operation of aeroponic system 10B, a control unit reservoir circulation device 91a urges liquid nutrient solution from control unit tank liquid nutrient solution reservoir 30 out through control unit outlet conduit length 92 and into first grow unit liquid nutrient solution reservoir 50. Concurrently, another reservoir circulation device 91a urges liquid nutrient solution from control unit tank liquid nutrient solution reservoir 30 out through control unit outlet conduit length 94b and into second grow unit liquid nutrient solution reservoir 70. Concurrently, second grow unit reservoir circulation device 91c urges liquid nutrient solution from second grow unit tank liquid nutrient solution reservoir 70, into control unit reservoir inlet conduit length 96b, where it is ultimately emitted back into control unit tank liquid nutrient solution reservoir 30. Concurrently, first grow unit reservoir circulation device 91b urges liquid nutrient solution from first grow unit tank liquid nutrient solution reservoir 50, into control unit reservoir inlet conduit length 96b, via first grow unit reservoir outlet conduit length 97, where it is ultimately emitted back into control unit tank liquid nutrient solution reservoir 30.

Figure 4:
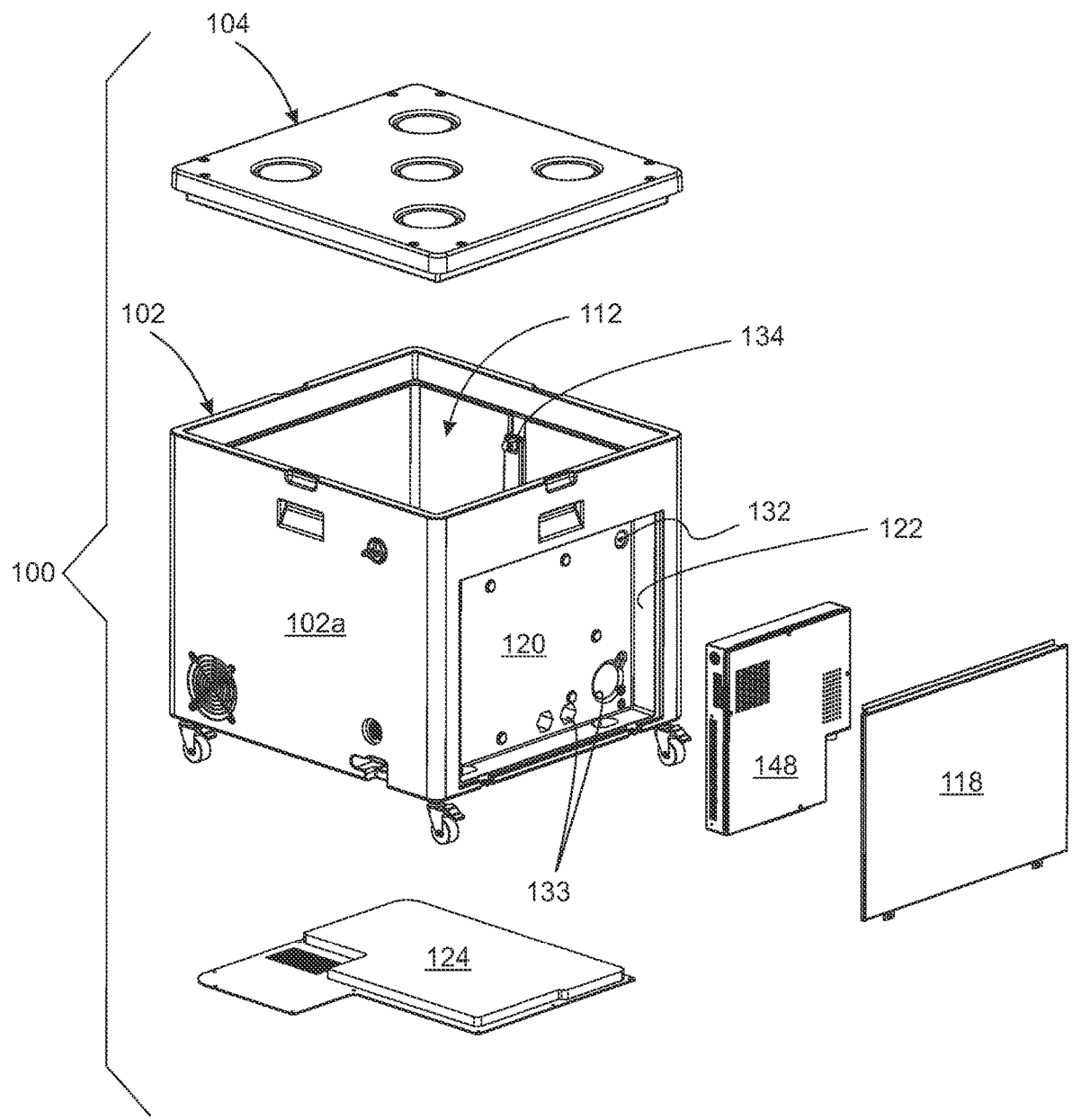
FIG. 4 is a partially exploded view of the exemplary control unit 100 introduced in FIG. 3.
Figure 5:
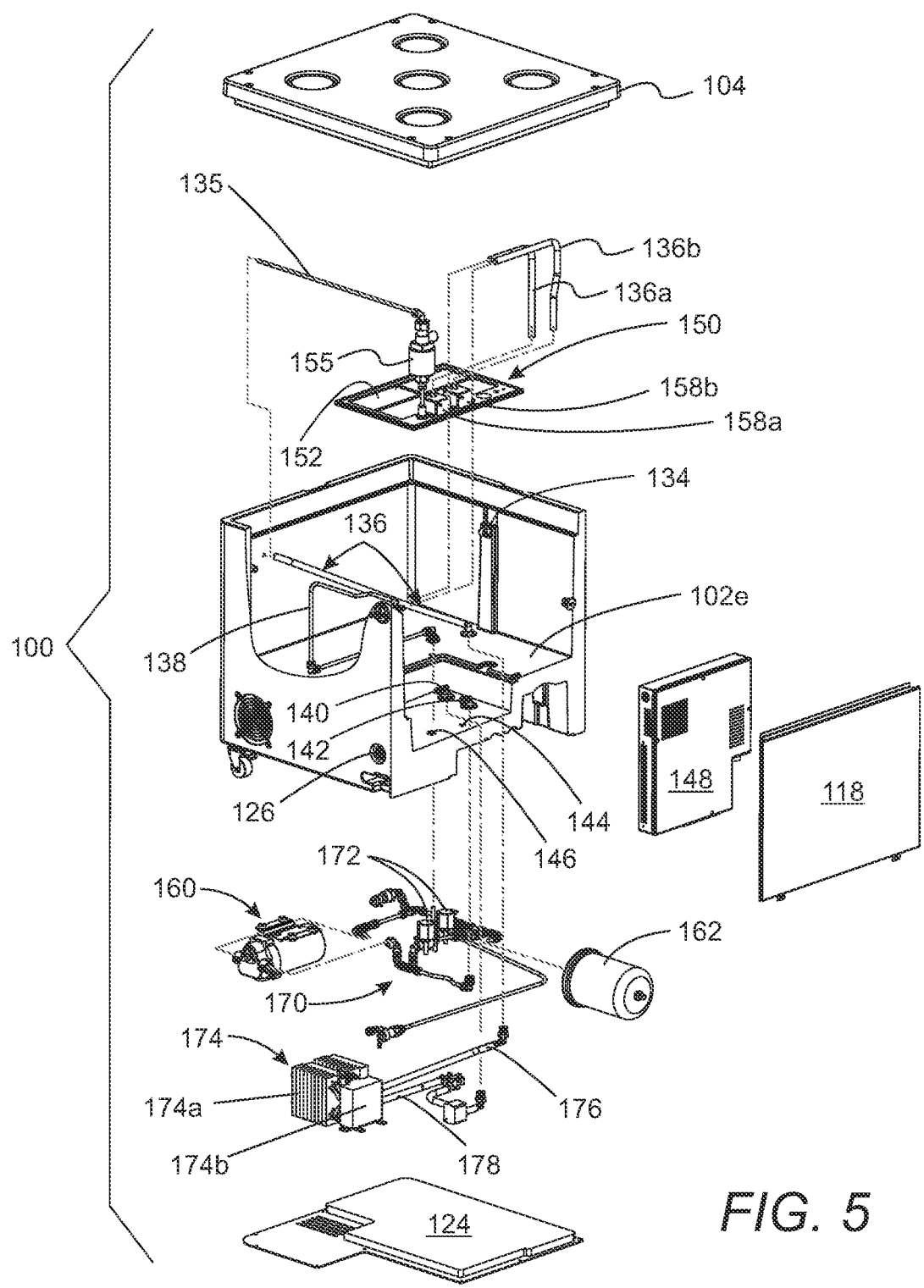
FIG. 5 is a fully exploded view of the exemplary control unit 100 introduced in FIG. 3.

Referring now primarily to FIGS. 3-6, an exemplary control unit 100 is shown in accordance with the present invention. Control unit 100 may include a control unit basin 102 at least partially defined by a front side 102a, a rear side 102b, a right side 102c, a left side 102d, and a bottom side 102e (FIG. 5). A control unit tank lid 104 is provided selectively attachable to an open upper end of control unit basin 102 to define a control unit tank interior chamber 112. When employed as a standalone combined control/grow unit, control unit tank lid 104 may incorporate a plurality of plant site openings 106 extending therethrough. When not being used, plant site openings 106 may be sealed with plant site opening covers 108. Alternatively, during use plant grow net cups 110 containing grow plants (not shown for clarity) may be received through plant site openings 106 such that corresponding grow plant roots hang within control unit tank interior chamber 112. Preferably, control unit tank basin 102 and control unit tank lid 104 have a thermally insulative construction in order to minimize the effect of an external ambient temperature on temperature fluctuations within control unit tank interior chamber 112. Control unit 100 may further incorporate wheels 114 at its lower corners in order to provide easy mobility along a support surface. Furthermore, a control unit vent (out) 116 may be provided as shown.

As best shown in FIGS. 4 and 5, a recessed cavity 122 may be formed along right side 102c of control unit tank basin 102 to define a containment pocket 120 for housing a smart controller 148. A control unit smart controller cover panel 118 is releasably attachable to right side 102c to provide selective access to the smart controller 148. Containment pocket 120 may include various openings/passageways for accommodating passage of smart controller electrical connectors and the like (not shown) therethrough, including a sensor inlet 132 for enabling connection of sensor cables/connectors directly to smart controller 148. A bottom side cover panel 124 may be provided for discreetly housing various controller unit electro-mechanical system components such as, for example, mist delivery system high pressure pump 160 and accumulator tank 164, mist delivery conduit subsystem plumbing and electronics subassembly 170, and reservoir circulation conduit subsystem temperature-regulating subassembly 174 (e.g. a chiller including radiator 174a and heat exchanger 174b).

Mist delivery conduit subsystem plumbing and electronics subassembly 170 includes a network of mist delivery conduit lengths in communication with various mist delivery related electronic components, including, for example, pressure sensors and solenoids. Generally, liquid nutrient solution is urged through the mist delivery conduit subsystem by high pressure pump 160. An accumulator tank 162 may be used to store the pressurized liquid nutrient solution and maintain the pressure in the delivery tubes of the mist delivery conduit subsystem. Maintaining a higher pressure when the nutrient solution is atomized reduces the occurrence of nutrient solution salt accumulation on the atomizing sprayers 134. Optionally, a pressure sensor may be used to monitor the nutrient pressure in order to prevent over/under pressurization. Solenoids 172, alternatively referred to as solenoid valves, are employed for controllably opening, closing, mixing, and distributing the flow of liquid nutrient solution through the mist delivery conduit subsystem (i.e. the solenoids control nutrient mist delivery timing). Preferably, a dedicated solenoid is provided for each atomizing misting nozzle in the system.

Figure 6:
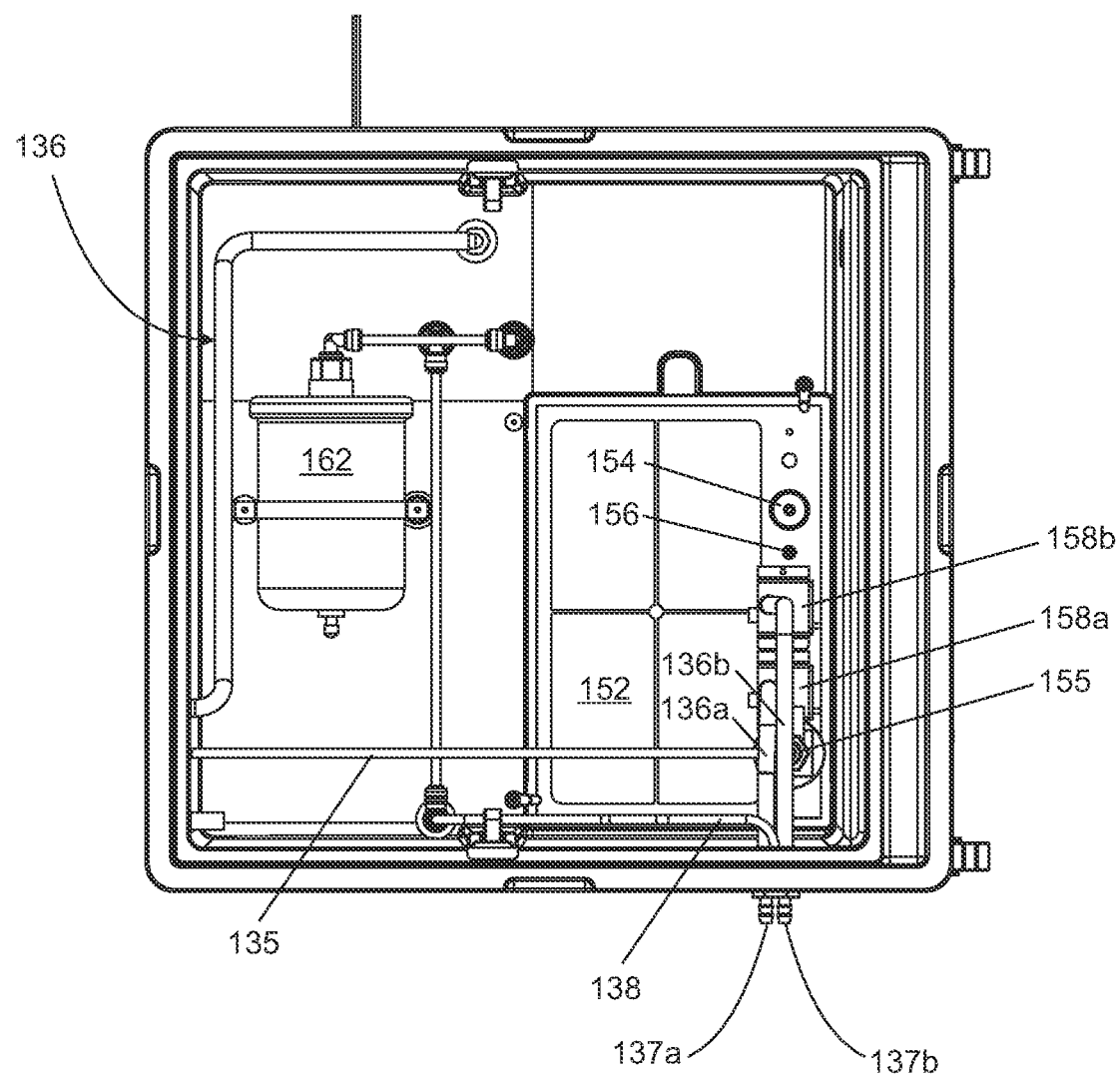
FIG. 6 is a top plan view of the fully-assembled exemplary control unit 100 introduced in FIG. 3, shown with the control unit tank lid 104 removed to expose the control unit interior.
Figure 7:
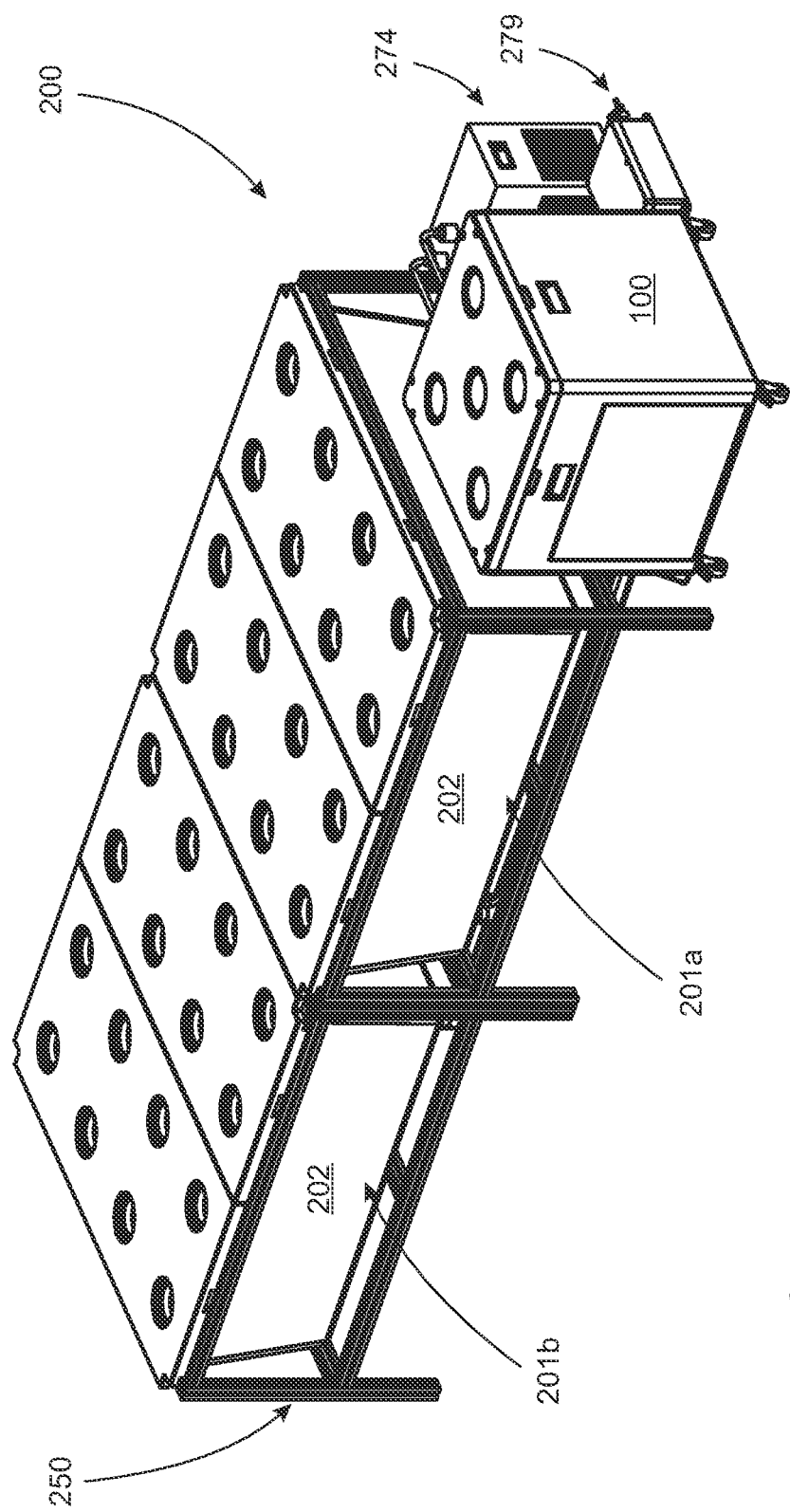
FIG. 7 is an upper-front-right side perspective view of a modular aeroponic system 200 in accordance with an exemplary implementation of the present invention.

Referring now particularly to FIGS. 5 and 6, further details of the components of the control unit 100 will now be described. Within control unit tank interior chamber 112, bottom side 102e incorporates a recessed portion 102f for containing, among other things, temperature control reservoir intake 140, mist delivery pressure pump intake 142, nutrient solution temperature sensor 144, and pressure sensor 146 for accurately determining the surface level of nutrient solution contained therein. Recessed portion 102f is covered by a nutrient solution filter panel 150, including nutrient solution filter 152, nutrient solution pH sensor 154, and nutrient solution electrical conductivity (EC) sensor 156 for monitoring nutrient solution salinity levels. Furthermore, submersible pumps, 158a and 158b, are supported atop panel 150, and function to urge liquid nutrient solution through reservoir circulation conduit subsystem conduits, 136a and 136b, out to respective first and second grow unit reservoir intakes.

As described in further detail herein, control unit 100 incorporates control unit reservoir conduit subsystem attachment sites/ports 137a, 137b and a control unit mist delivery conduit subsystem attachment site/port 139, which are used for interconnecting reservoir circulation and mist delivery conduit subsystem conduits of control unit 100 with respective reservoir circulation and mist delivery conduit subsystem conduits associated with respective grow units 201a, 201b of the modular aeroponic grow system 200 shown in FIGS. 7-11. Moreover, control unit 100 includes a liquid nutrient solution drain port 126, which may be used for draining liquid nutrient solution from control unit tank interior chamber 112 when the control unit is being operated as a standalone aeroponics system (i.e. wherein the control unit functions as a standalone growing unit). Control unit 100 further includes a pressure release valve 128 and a release valve tube connection site 130. With regard to modular aeroponic grow system 200 (i.e. wherein control unit 100 is in fluid communication with first and second grow units, 201a and 201b, respectively) port 126 functions as return input site for a grow unit reservoir circulation conduit subsystem 236.

Figure 9:
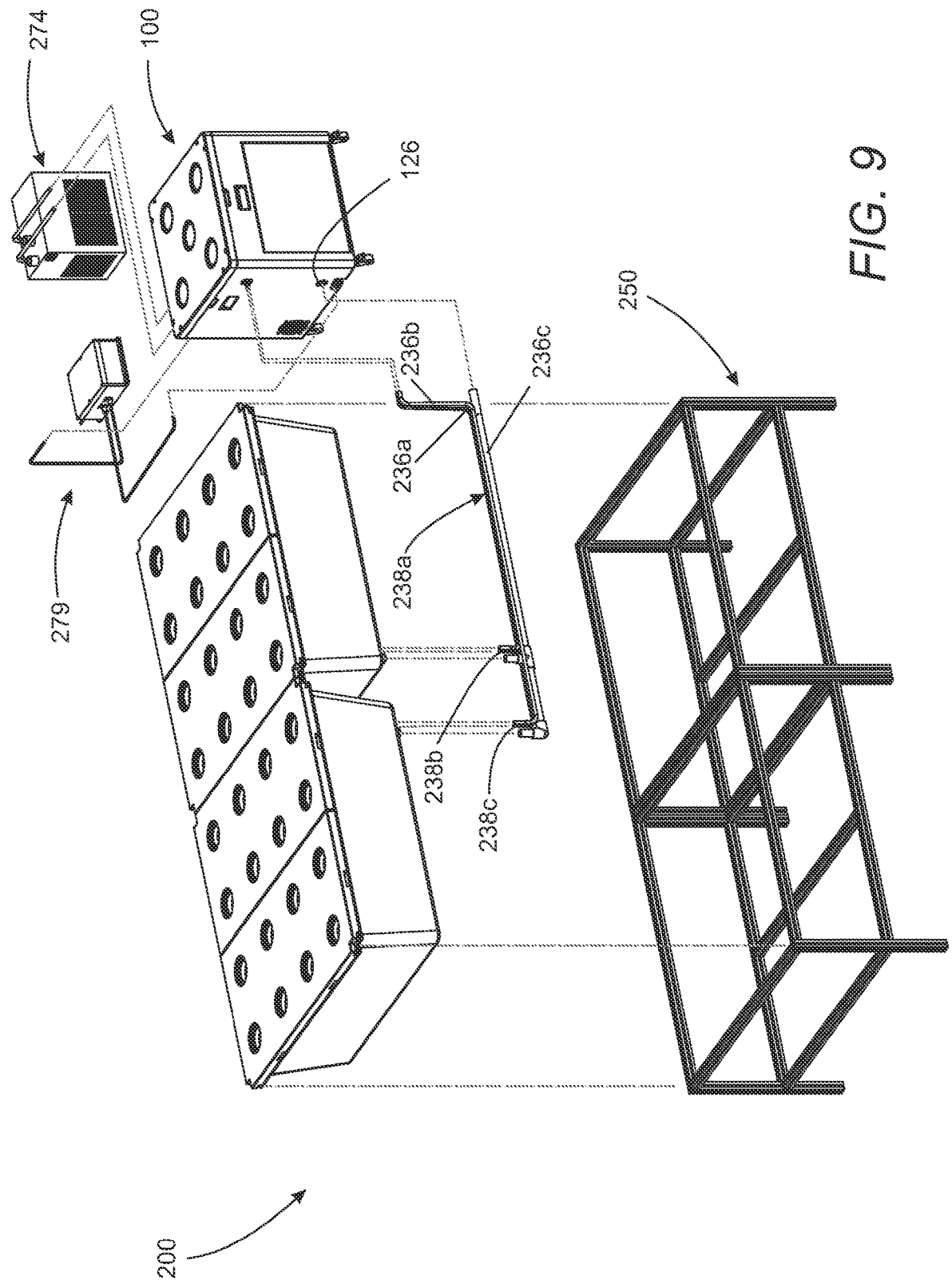
FIG. 9 is an upper-front-left side perspective view of the modular aeroponic system 200 introduced in FIG. 7, shown partially exploded to expose exterior, intermediate conduits of the reservoir circulation and mist delivery conduit subsystems.
Figure 10:
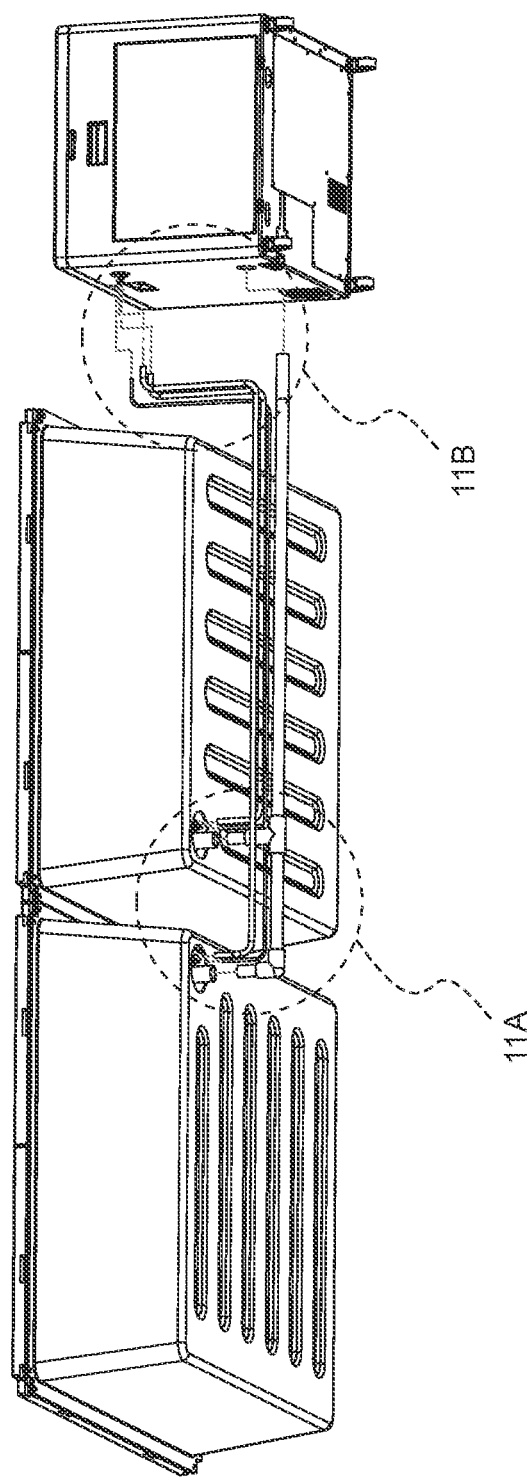
FIG. 10 is a lower-front-left side perspective view of the modular aeroponic system 200 of FIG. 9.
Figure 11A:
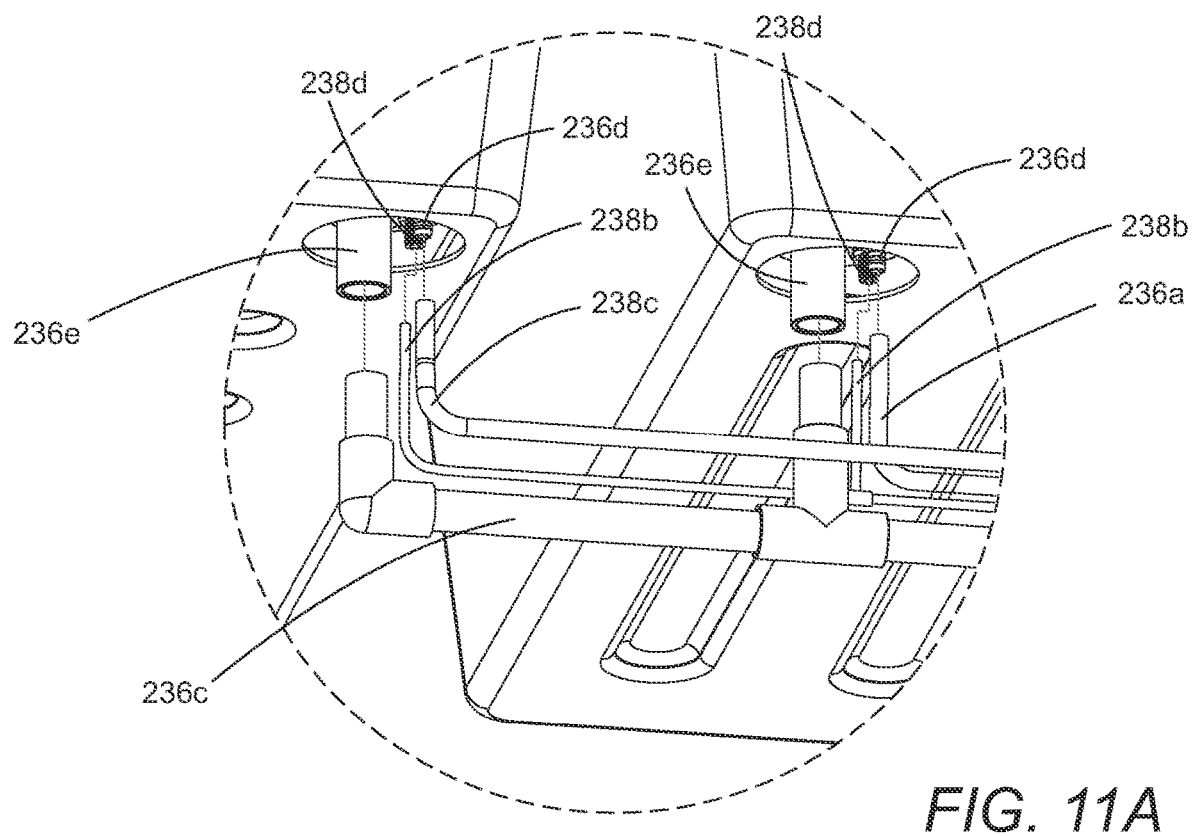
FIG. 11A is an enlarged/magnified view detailing the connection points of the intermediate conduits of the reservoir circulation and mist delivery conduit subsystems to adjacent grow units 201a, 201b of modular aeroponic system 200.
Figure 11B:
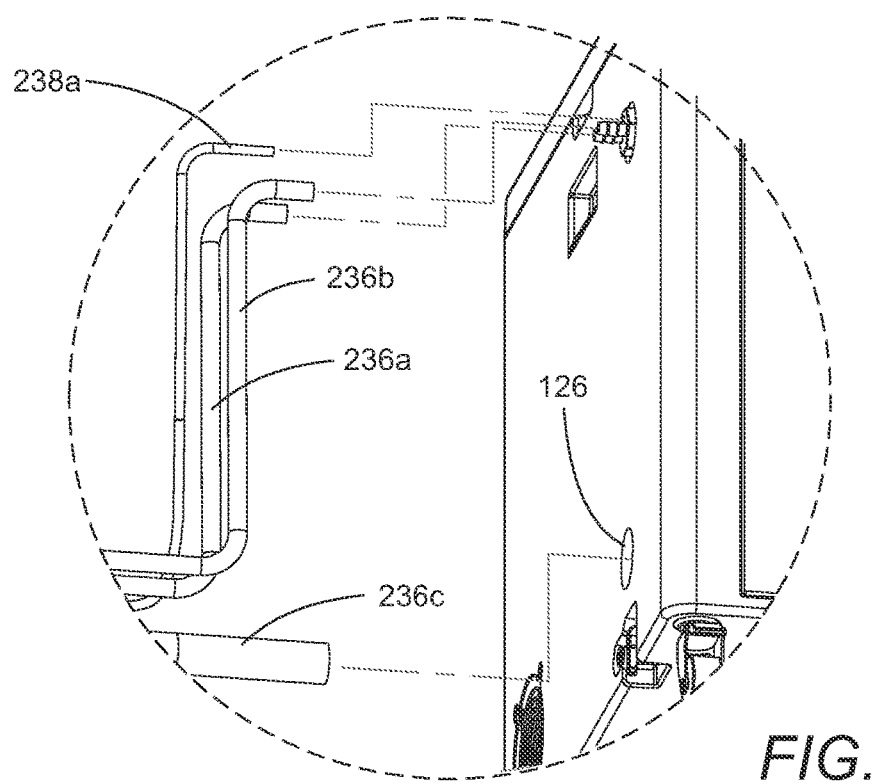
FIG. 11B is an enlarged/magnified view detailing the connections of the intermediate conduits of the reservoir circulation and mist delivery conduit subsystems to the control unit 100 of modular aeroponic system 200.

Referring briefly to FIGS. 9-11 in conjunction with FIGS. 1-6, as described in more detail herein, a first control unit attachment site/port 137a is provided for attachment of a first grow unit reservoir circulation conduit subsystem conduit 236a (FIG. 11A) out to a first grow unit 201a, and a second control unit attachment site/port 137b is provided for attachment of a second reservoir circulation conduit subsystem conduit 236b (FIG. 11A) out to a second grow unit 201b. Moreover, a third control unit attachment site/port 139 is provided for attachment (or passage therethrough) of a grow unit mist delivery conduit subsystem conduit 238 out to grow unit mist delivery conduit subsystem inlet ports 238c.

Figure 8:
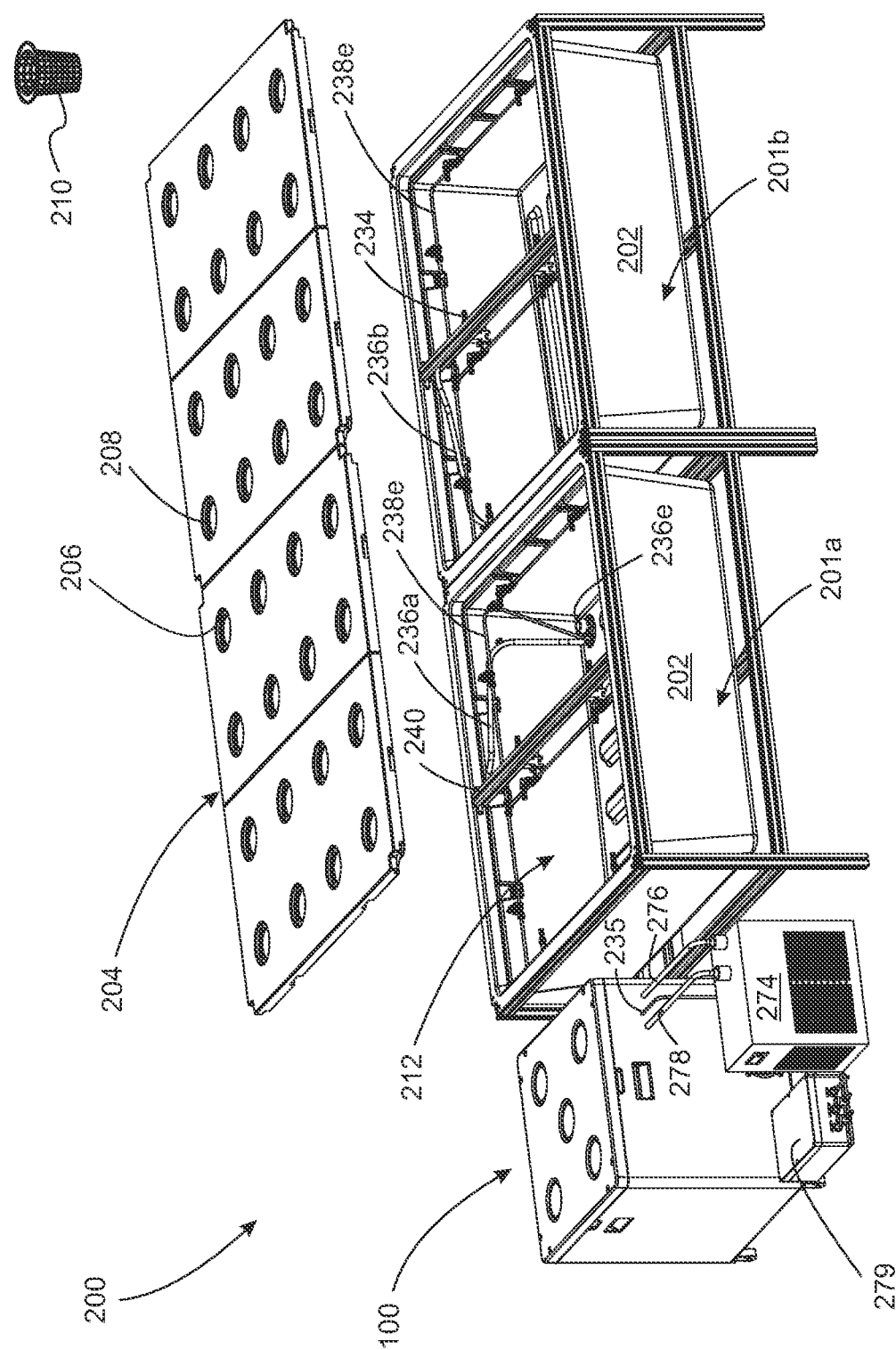
FIG. 8 is an upper-rear-right side perspective view of the modular aeroponic system 200 introduced in FIG. 7, shown with grow unit tank lid 204 removed to expose the interior compartments 212 of respective grow units 201a and 201b.

Referring now to FIGS. 7-11, a modular aeroponic grow system 200 is shown in accordance with an exemplary implementation of the present invention. Modular aeroponic grow system 200 generally includes a control unit 100 in fluid communication with first and second grow units, 201a and 201b, respectively. As will be apparent to those skilled in the art two grow units are shown merely for convenience. The modular aeroponic grow system of the present invention may be employed for use with any number of grow units. Significantly, the modular configuration of the present invention lends itself to the efficient addition/subtraction of plant grow units based upon the needs of a particular operator. In the particular embodiment shown in FIGS. 7-11, liquid nutrient solution temperature-regulating equipment 274 is preferably provided externally of control unit 100 (i.e. as opposed to the standalone combined controller/grow unit implementation, wherein temperature-regulating equipment may be integrated within the control unit itself). Furthermore, a plumbing control box 279 may be provided for, among other things, controlling water intake from an external main line (not shown) to control unit 100. The grow units 201a, 201b are preferably supported upon a grow unit support framework 250. Each grow unit 201a, 201b may include a grow unit tank basin 202 and grow unit tank lid 204. Grow unit tank lid 204 preferably has the same plant-receiving structure as was previously described with respect to control unit tank lid 104 (i.e. where control unit 100 functions as a standalone unit). As best shown in FIG. 8, the grow unit tank lids 204 each incorporate plant site openings 206 that cooperate with plant site opening covers 208 and plant grow net cups 210. Together, grow unit tank basin 202 and tank lid 204 define a grow unit tank interior compartment 212.

Generally, interior compartments 212 of the grow units 201a, 201b incorporate conduit lengths 236a, 236b of grow unit reservoir circulation subsystem 236 in fluid communication with corresponding conduit lengths 136a, 136b of control unit reservoir circulation conduit subsystem 136, as well as conduit lengths 238e of grow unit mist delivery conduit subsystem 238 in fluid communication—via intermediate conduit lengths 238a, 238b—with corresponding conduit lengths of control unit mist delivery conduit subsystem 138.

More specifically, an interconnecting conduit length 236a of grow unit reservoir circulation conduit subsystem 236 has an inlet end attached to control unit port 137a, and an opposite outlet end attached to grow unit reservoir conduit inlet 236d of first grow unit 201a. Similarly, an interconnecting conduit length 236b of grow unit reservoir circulation subsystem 236 has an inlet end attached to control unit port 137b, and an opposite outlet end attached to grow unit reservoir conduit inlet 236d of second grow unit 201b. In this manner, liquid nutrient solution is pumped from the control unit reservoir directly to the first and second grow unit reservoirs. A grow unit reservoir return conduit 236c has a pair of inlet ends coupled to grow unit reservoir conduit outlets 236e of the respective grow units 201a, 201b and an outlet end coupled to grow unit reservoir return inlet 126 of control unit 100. In this manner, liquid nutrient solution is pumped from the grow unit reservoirs directly back to the control unit reservoir—thereby completing the closed loop.

Grow unit mist delivery conduit subsystem 238 may incorporate a main conduit 238a having an inlet end attached to control unit port 139, and a pair of conduit outlet ends, 238b and 238c, coupled to conduit inlets 238d of respective first and second grow units, 201a and 201b. Liquid nutrient solution is pumped through grow unit mist delivery conduit subsystem conduits 238e within the grow unit interior compartments 212, which include lengths of heat-conductive staging tube (not shown) functioning similar to the heat-conducting staging tubes 54, 74 shown in FIGS. 1 and 2 and previously described herein. In this manner, temperature-regulated liquid nutrient solution is pumped from the control unit reservoir directly to corresponding mist delivery nozzles 234 mounted within the interior compartments 212 of the respective grow units 201a, 201b.

Since many modifications, variations, and changes in detail can be made to describe preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

For instance, as previously described, the present invention incorporates a highly-effective, novel means for utilizing liquid nutrient solution reservoirs within a control unit tank and corresponding grow unit tanks to regulate and maintain stability of root zone temperatures within the grow units tanks. As described, one means of doing so employs heat-conducting misting subsystem staging tubes running through grow unit reservoirs of liquid nutrient solution circulating completely independent of, and isolated from, the liquid nutrient solution delivered from the control unit reservoir to the grow unit misting devices. Again, surrounding the staging tubes of the misting delivery system with the temperature-controlled reservoirs in the grow units effectively stabilizes the temperature of the nutrient solution prior to its delivery to the plant roots. Applicant contemplates incorporating this same principal via alternate configurations of the isolated, dual reservoir circulation and misting delivery conduit subsystems.

For example, in one alternate embodiment applicant contemplates incorporating a concentric reservoir system and misting system conduits wherein a nutrient solution mist delivery conduit is surround by a larger-diameter concentric reservoir circulation conduit, such that, for example, cooling the temperature of liquid nutrient solution flowing through the reservoir circulation conduit will cause a temperature reduction of liquid nutrient solution flowing through the misting system conduit, thereby stabilizing the temperature of the liquid nutrient solution prior to its emission from the misting nozzles. Applicant further contemplates another alternate embodiment wherein lengths of reservoir circulation conduit and misting system conduit are positioned parallel to and in contact with one another, and then encapsulating the respective conduit lengths in a temperature insulating material to promote heat transfer between the misting solution and the reservoir solution. For example, in this manner the temperature of liquid nutrient solution flowing through misting system tubes can be effectively reduced by cooling the corresponding temperature of liquid nutrient solution flowing through the reservoir circulation tubes.

What is claimed is:

1. A modular aeroponic grow system utilizing temperature-regulated liquid nutrient solution to maintain temperature stability of a plant root within a grow system environment, the system comprising:
   a control unit, including
      a control unit tank defining a control unit tank interior chamber,
      a control unit reservoir of liquid nutrient solution contained within said control unit tank interior chamber,
      a control unit reservoir temperature-regulating device for regulating the temperature of said control unit reservoir of liquid nutrient solution,
      a control unit reservoir pressurizing device in fluid communication with said control unit reservoir of liquid nutrient solution, and
      a control unit reservoir circulation device in fluid communication with said control unit reservoir of liquid nutrient solution;
   at least one grow unit, including
      a grow unit tank defining a grow unit tank interior chamber, and
      a grow unit reservoir of liquid nutrient solution contained within the grow unit tank interior chamber of said at least one grow unit;
   a reservoir circulation conduit system in fluid communication with said control unit reservoir and said at least one grow unit reservoir, wherein liquid nutrient solution is urged through said reservoir circulation conduit system by said control unit reservoir circulation device; and
   a liquid nutrient solution mist delivery conduit system, including
      a mist delivery conduit system input end in fluid communication with the control unit reservoir via said control unit reservoir pressurizing device, and
      a mist delivery conduit system grow unit output end extending through said at least one grow unit reservoir and terminating within said at least one grow unit interior chamber at a grow unit mist delivery device,
   wherein air temperature stability within the interior chamber of said at least one grow unit is maintained by regulating the temperature of liquid nutrient solution flowing through said mist delivery conduit system, and
   wherein the temperature of liquid nutrient solution flowing through said mist delivery conduit system is maintained by regulating the temperature of liquid nutrient solution flowing through said reservoir circulation conduit system.

2. The modular aeroponic grow system recited in claim 1, wherein said at least one grow unit further comprises two grow units, the modular aeroponic grow system further comprising:
   a first grow unit, including
      a first grow unit tank defining a first grow unit tank interior chamber, and
      a first grow unit reservoir of liquid nutrient solution contained within said first grow unit tank interior chamber; and
   a second grow unit, including
      a second grow unit tank defining a second grow unit tank interior chamber, and
      a second grow unit reservoir of liquid nutrient solution contained within said second grow unit tank interior chamber,
   said reservoir circulation conduit system in fluid communication with said control unit reservoir, said first grow unit reservoir and said second grow unit reservoir, wherein said control unit reservoir circulation device affects the circulation of said control unit reservoir, said first grow unit reservoir, and said second grow unit reservoir through said reservoir circulation conduit system, and
   said liquid nutrient solution mist delivery conduit system grow unit output end further including
      a mist delivery conduit system first grow unit output end extending through the first grow unit reservoir of liquid nutrient solution and terminating within the first grow unit interior chamber at a first grow unit mist delivery device, and
      a mist delivery conduit system second grow unit output end extending through the second grow unit reservoir of liquid nutrient solution and terminating within the second grow unit interior chamber at a second grow unit mist delivery device.

3. The modular aeroponic grow system recited in claim 2, wherein:
   air temperature stability within the first grow unit interior chamber is maintained by regulating the temperature of the first grow unit reservoir of liquid nutrient solution; and
   air temperature stability within the second grow unit interior chamber is maintained by regulating the temperature of the second grow unit reservoir of liquid nutrient solution.

4. The modular aeroponic grow system recited in claim 3, wherein the respective temperatures of the first and second grow unit reservoirs of liquid nutrient solution are controlled by the corresponding regulation, via said control unit reservoir temperature-regulating device, of the temperature of the control unit reservoir of liquid nutrient solution.

5. The modular aeroponic grow system recited in claim 2, wherein the first grow unit tank further comprises:
   a first grow unit tank basin; and
   a first grow unit tank lid covering said first grow unit tank basin, said first grow unit tank lid having an opening therein for receiving plant roots therethrough such that the plant roots are contained within said first grow unit tank interior chamber.

6. The modular aeroponic grow system recited in claim 5, wherein the second grow unit tank further comprises:
   a second grow unit tank basin; and
   a second grow unit tank lid covering said second grow unit tank basin, said second grow unit tank lid having an opening therein for receiving plant roots therethrough such that the plant roots are contained within said second grow unit tank interior chamber.

7. The modular aeroponic grow system recited in claim 6, wherein:
   said first grow unit tank basin and tank lid each have a thermally-insulative construction; and
   said second grow unit tank basin and tank lid each have a thermally-insulative construction.

8. The modular aeroponic grow system recited in claim 2, wherein the control unit reservoir temperature-regulating device further comprises:
   a liquid nutrient solution temperature-sensing component; and a liquid nutrient solution temperature-adjusting component.

9. The modular aeroponic grow system recited in claim 8, wherein the control unit further comprises a liquid level sensing device for measuring a surface level of the control unit reservoir of liquid nutrient solution.

10. The modular aeroponic grow system recited in claim 2, wherein the reservoir conduit system has a serial circuit configuration and further comprises:
   a control unit reservoir transfer conduit for transferring liquid nutrient solution directly from said control unit reservoir to said first grow unit reservoir;
   a first grow unit reservoir transfer conduit for transferring liquid nutrient solution directly from said first grow unit reservoir to said second grow unit reservoir; and
   a second grow unit reservoir transfer conduit for transferring liquid nutrient solution directly from said second grow unit reservoir back to said control unit reservoir.

11. The modular aeroponic grow system recited in claim 2, wherein the reservoir conduit system has a parallel circuit configuration and further comprises:
   a control unit reservoir first transfer conduit for transferring liquid nutrient solution directly from said control unit reservoir to said first grow unit reservoir via a first control unit reservoir transfer conduit pump;
   a control unit reservoir second transfer conduit for transferring liquid nutrient solution directly from said control unit reservoir to said second grow unit reservoir via a second control unit reservoir transfer conduit pump;
   a first grow unit reservoir transfer conduit for transferring liquid nutrient solution directly from said first grow unit reservoir back to said control unit reservoir via a first grow unit reservoir transfer conduit pump; and
   a second grow unit reservoir transfer conduit for transferring liquid nutrient solution directly from said second grow unit reservoir back to said control unit reservoir via a second grow unit reservoir transfer conduit pump.

12. The modular aeroponic grow system recited in claim 2, wherein:
   said mist delivery conduit system first grow unit output end extending through said first grow unit reservoir of liquid nutrient solution further comprises a first heat-conducting staging tube length terminating at said first grow unit mist delivery device; and
   said mist delivery conduit system second grow unit output end extending through said second grow unit reservoir of liquid nutrient solution further comprises a second heat-conducting staging tube length terminating at said second grow unit mist delivery device.

13. The modular aeroponic grow system recited in claim 2, wherein said control unit reservoir pressurizing device further comprises at least one of:
   a liquid pump;
   a liquid accumulator tank;
   an air compressor; and
   an air-siphoning device.

14. The modular grow system recited in claim 2, further comprising a smart control system in communication with said control unit.

15. The modular grow system recited in claim 14, wherein said smart control system further comprises a smart controller module integrated into said control unit, said smart controller module performing automated temperature-sensing and surface level-sensing of said control unit reservoir of liquid nutrient solution, and said smart controller module performing automated actuation of said control unit reservoir temperature-regulating device and said control unit reservoir circulation device.

16. The modular grow system recited in claim 15, wherein the smart control system further comprises a remote control terminal in communication with said smart controller module.

17. A method for utilizing temperature-regulated liquid nutrient solution within a modular aeroponic grow system to maintain temperature stability of a plant root within a grow system environment, the method comprising steps of:
   (a) providing a modular aeroponic grow system including a control unit and at least one grow unit in fluid communication with said control unit via a reservoir circulation conduit system and via a liquid nutrient solution mist delivery conduit system, said reservoir circulation conduit system and said liquid nutrient solution mist delivery conduit system fluidly isolated from each other,
      wherein the control unit includes a control unit tank defining a control unit tank interior chamber, a control unit reservoir of liquid nutrient solution contained within the control unit tank interior chamber, a control unit reservoir temperature-regulating device for regulating the temperature of the control unit reservoir of liquid nutrient solution, and a control unit reservoir circulation device in fluid communication with the control unit reservoir of liquid nutrient solution,
      wherein said at least one grow unit includes a first grow unit tank defining a first grow unit tank interior chamber, and a first grow unit reservoir of liquid nutrient solution contained within said first grow unit tank interior chamber,
      wherein said reservoir circulation conduit system is in fluid communication with said control unit reservoir and said first grow unit reservoir, said control unit reservoir circulation device cooperating with said reservoir circulation conduit system to circulate the liquid nutrient solutions of said control unit reservoir and said at least one grow unit reservoir therethrough, and
      wherein said liquid nutrient solution mist delivery conduit system includes a mist delivery conduit system input end in fluid communication with said control unit reservoir of liquid nutrient solution via said control unit reservoir pressurizing device, a liquid nutrient solution mist delivery conduit system output end extending through the first grow unit reservoir of liquid nutrient solution and terminating within the first grow unit interior chamber at a first grow unit mist delivery device; and
   (b) stabilizing air temperature within the interior chamber of said at least one grow unit by regulating the temperature of liquid nutrient solution flowing through the liquid nutrient mist delivery conduit system.

18. The method recited in claim 17, further comprising a step of:
   (c) regulating the temperature of liquid nutrient solution flowing through the reservoir conduit system, wherein the regulation of the temperature of liquid nutrient solution flowing through the reservoir conduit system functions to regulate the temperature of liquid nutrient solution flowing through the liquid nutrient solution mist delivery conduit system.

19. The method recited in claim 18, further comprising a step of:
 (d) stabilizing air temperature within said first grow unit tank interior chamber by regulating the temperature of the first grow unit reservoir of liquid nutrient solution, to thereby control thermal radiation of the first grow unit reservoir of liquid nutrient solution into said first grow unit tank interior chamber.

20. The method recited in claim 17, wherein regulation of the temperature of liquid nutrient solution flowing through said liquid nutrient solution mist delivery conduit system further comprises regulating the temperature of the control unit reservoir of liquid nutrient solution via the control unit reservoir temperature-regulating device.

* * * * *